(12) United States Patent
Chukka et al.

(10) Patent No.: US 9,996,924 B2
(45) Date of Patent: Jun. 12, 2018

(54) SYSTEMS AND METHODS FOR SPECTRAL UNMIXING OF MICROSCOPIC IMAGES USING PIXEL GROUPING

(71) Applicant: Ventana Medical Systems, Inc., Tucson, AZ (US)

(72) Inventors: Srinivas Chukka, San Jose, CA (US); Quan Yuan, San Jose, CA (US)

(73) Assignee: Ventana Medical Sytems, Inc., Tucson, AZ (US)

( * ) Notice: Subject to any disclaimer, the term of this patent is extended or adjusted under 35 U.S.C. 154(b) by 0 days. days.

(21) Appl. No.: 15/195,895

(22) Filed: Jun. 28, 2016

(65) Prior Publication Data

US 2017/0053397 A1 Feb. 23, 2017

Related U.S. Application Data

(63) Continuation of application No. PCT/EP2014/078392, filed on Dec. 18, 2014.
(Continued)

(51) Int. Cl.
*G06T 7/00* (2017.01)
*G06K 9/00* (2006.01)
(Continued)

(52) U.S. Cl.
CPC .......... *G06T 7/0012* (2013.01); *G06K 9/0014* (2013.01); *G06K 9/00127* (2013.01);
(Continued)

(58) Field of Classification Search
CPC combination set(s) only.
See application file for complete search history.

(56) References Cited

U.S. PATENT DOCUMENTS

| 5,784,162 A | * | 7/1998 | Cabib | C12Q 1/6841 |
| | | | | 250/461.2 |
| 6,430,430 B1 | * | 8/2002 | Gosche | G06T 7/0012 |
| | | | | 128/920 |

(Continued)

FOREIGN PATENT DOCUMENTS

| NO | 2012152693 A1 | 11/2012 |
| NO | 2014140219 A1 | 9/2014 |

OTHER PUBLICATIONS

Burton, K., et al., 2009, "Spectral Optical Imaging in Biology and Medicine", Biomedical Optical Imaging, pp. 29-73, Oxford University Press.
(Continued)

*Primary Examiner* — Tsung-Yin Tsai
(74) *Attorney, Agent, or Firm* — Ventana Medical Systems, Inc.

(57) ABSTRACT

Systems and methods for speeding up a spectral unmixing process by using pixel groups are disclosed. Operations including forming groups of similar pixels, and unmixing only one representative pixel from each pixel group enable determination of an unmixing result for all the pixels in the group. A similarity metric may be based on a dot product of an unprocessed pixel with the representative pixel in the subset of pixels. The method is repeated for any number of remaining unmatched pixels that exceed a threshold, until the number of remaining or unmatched pixels is smaller than the threshold, upon which the remaining pixels may be individually unmixed. Significantly fewer unmixing operations are performed on an image, thereby speeding up the unmixing process.

20 Claims, 7 Drawing Sheets

Related U.S. Application Data

(60) Provisional application No. 61/922,357, filed on Dec. 31, 2013.

(51) Int. Cl.
*G06K 9/62* (2006.01)
*G06K 9/46* (2006.01)
*G06K 9/52* (2006.01)
*G06T 3/40* (2006.01)

(52) U.S. Cl.
CPC ............ *G06K 9/4642* (2013.01); *G06K 9/52* (2013.01); *G06K 9/6215* (2013.01); *G06K 9/6218* (2013.01); *G06K 9/6232* (2013.01); *G06T 3/40* (2013.01); *G06K 2009/4666* (2013.01); *G06T 2207/10056* (2013.01); *G06T 2207/20021* (2013.01)

(56) References Cited

U.S. PATENT DOCUMENTS

| | | | |
|---|---|---|---|
| 8,290,236 B2 | 10/2012 | Lett et al. | |
| 2003/0138140 A1* | 7/2003 | Marcelpoil | G01N 15/1475 382/162 |
| 2009/0257640 A1* | 10/2009 | Gossage | G06K 9/0014 382/133 |
| 2010/0290692 A1* | 11/2010 | Macaulay | G06T 7/0012 382/133 |
| 2012/0112098 A1* | 5/2012 | Hoyt | B82Y 30/00 250/459.1 |
| 2013/0272617 A1 | 10/2013 | Conger | |
| 2013/0341192 A1 | 12/2013 | Dunbar et al. | |

OTHER PUBLICATIONS

Chen., T., et al., "Adaptive Spectral Unmixing for Histopathology Fluroescent Images", Ventana Medical Systems, Inc., a Member of the Roche Group, CA, USA.

Hernandez, G. M., 2013, "Design and implementation of new methods for spatial preprocessing prior to spectral unmixing of remotely sensed hyperspectral data", Tesis Doctoral, Universidad de Extremadura, Spain.

International Search Report dated Mar. 26, 2015 in Application No. PCT/EP2014/078392, 5 pages.

Jain, A. K., et al., "Algorithms for Clustering Data," Prentice Hall Advanced Reference Series, 1988, Prentice-Hall, Inc., Englewood Cliffs, NJ.

Keshava, N., "A Survey of Spectral Unmixing Algorithms", Lincoln Laboratory Journal, 2003, vol. 14, No. 1, pp. 55-77, Massachussetts Institute of Technology, Lexington, MA.

Lawson, C. L., et al., "Linear Inequality Constraints," Solving Least Squares Problems, Chapter 23, Section 3, p. 161, Prentice-Hall, Inc., Englewood Cliffs, NJ.

Rogowska, J., "Overview and Fundamentals of Medical Image Segmentation," Handbook of Medical Imaging, Processing and Analysis, 2000, Chapter 5, pp. 69-85. Academic Press.

\* cited by examiner ystems and Methods for Spectral Unmixing of Microscopic Images Using Pixel Grouping

CROSS-REFERENCE TO RELATED APPLICATIONS

This patent application is a continuation of International Patent Application No. PCT/EP2014/078392 filed Dec. 18, 2014, which claims priority to and the benefit of U.S. Provisional Patent Application No. 61/922,357 filed Dec. 31, 2013. Each patent application is incorporated herein by reference as if set forth in its entirety.

BACKGROUND OF THE SUBJECT DISCLOSURE

Field of the Subject Disclosure

The present subject disclosure relates to spectral unmixing in digitized brightfield and fluorescence microscopy. More particularly, the present subject disclosure relates to accelerating the spectral unmixing process by identifying groups of similar pixels and spectrally unmixing similar pixels together.

Background of the Subject Disclosure

In a multiplex slide of a tissue specimen, different nuclei and tissue structures are simultaneously stained with specific biomarker-specific stains, which can be either chromogenic or fluorescent dyes, each of which has a distinct spectral signature, in terms of spectral shape and spread. The spectral signatures of different biomarkers can be either broad or narrow spectral banded and spectrally overlap. A slide containing a specimen, for example an oncology specimen, stained with some combination of dyes is imaged using a multi-spectral imaging system. Each channel image corresponds to a spectral band. The multi-spectral image stack produced by the imaging system is therefore a mixture of the underlying component biomarker expressions, which, in some instances, may be co-localized. More recently, quantum dots are widely used in immunofluorescence staining for the biomarkers of interest due to their intense and stable fluorescence.

Identifying the individual constituent stains for the biomarkers and the proportions they appear in the mixture is a fundamental challenge that is solved using a spectral unmixing operation. Spectral unmixing decomposes each pixel of the multi-spectral image into a collection of constituent spectrum end members or components, and the fractions of their intensity contributions in the multi-spectral image from each of them. An example spectral unmixing method is a non-negative linear least squares operation commonly used both in fluorescent and brightfield microscopy. This operation is typically performed on every pixel of an image, one at a time.

The publication 'Adaptive Spectral Unmixing for Histopathology Fluorescent Images' by Ting Chen et al, Ventana Medical Systems, Inc. provides an introduction and an overview as to various prior art techniques for spectral unmixing of multiplex slides of biological tissue samples, the entirety of which is herein incorporated by reference. Various other techniques for spectral unmixing of tissue images are known from WO 2012/152693 A1 and WO 2014/140219 A1.

SUMMARY OF THE SUBJECT DISCLOSURE

The present invention provides for an improved imaging method and an improved imaging system as claimed. The dependent claims are directed towards embodiments of the invention.

A 'biological tissue sample' as understood herein is any biological sample, such as a surgical specimen that is obtained from a human or animal body for anatomic pathology. The biological sample may be a prostrate tissue sample, a breast tissue sample, a colon tissue sample or a tissue sample obtained from another organ or body region.

A 'multiplex' or 'multi-spectral' pixel as understood herein encompasses a pixel contained in a digital image obtained from a biological tissue sample in which different nuclei and tissue structures are simultaneously stained with specific fluorescent dyes each of which fluoresces in a different spectral band.

Embodiments of the invention are particularly advantageous as the number of computations that need to be performed for unmixing an image of a multiplex fluorescent slide of a tissue sample is substantially reduced. This is due to the fact that the computationally expensive spectral unmixing by execution of an unmixing algorithm does not need to be performed for each multi-spectral pixel of the image as the unmixing results obtained by execution of the unmixing algorithm are reused for one or more similar pixels. This enables to reduce processing times and substantially increase the throughput of an imaging system which is very beneficial in a healthcare environment.

In accordance with embodiments of the present invention any unmixing algorithm can be used for unmixing of a selected first input pixel including such as but not limited to unmixing algorithms described in 'A Survey of Spectral Unmixing Algorithms', Nirmal Keshava, Lincoln Laboratory Journal, Volume 14, No. 1, 2003, pages 55-77.

In accordance with embodiments of the invention the image data is acquired from the biological tissue sample by means of an optical system, such as a microscope. Depending on the implementation the optical system can be separate from the imaging system or it can be an integral part of the imaging system.

In accordance with embodiments of the invention the spectral unmixing of the acquired image data is performed as follows: initially the acquired image data contains multi-spectral unprocessed pixels that require unmixing. A first input pixel is selected from the unprocessed pixels for processing, i.e. for spectral unmixing. This selection of the first input pixel may be a random or pseudorandom choice or it may be performed in accordance with a predefined selection scheme or by generating a histogram of pixel intensity values and selecting the first pixel from the most frequently occurring pixels in the histogram.

Next, spectral unmixing of the selected first input pixel is performed using an unmixing algorithm that provides an unmixing result for the first input pixel.

In the next step an attempt is made for reusing the unmixing result obtained for the first input pixel for other unprocessed pixels that require unmixing. This is done by searching the unprocessed pixels for at least a second pixel that is similar to the first input pixel, i.e. that meets a predefined similarity criterion with respect to the first input pixel. Multiple second pixels that are identified by the search may be grouped in a group or cluster of second pixels.

The unmixing result obtained for the first input pixel is reused for the at least one second pixel identified in the search which avoids re-execution of the unmixing algorithm for that second pixel such that the unmixing result for the second pixel is obtained in a minimal amount of time and by a minimal number of computational steps. For example, the at least one second pixel has a spectral distribution of intensity values that is—apart from a scaling factor—identical or quasi-identical to the unprocessed first input pixel. In this instance the unmixing result obtained for the first input pixel can be reused for the second pixel by multiplying the unmixing result obtained for the first input pixel by the scaling factor, which replaces the computationally expensive unmixing algorithm by a multiplication.

The term 'unprocessed pixel' as understood herein refers to a pixel of an image acquired from the biological tissue sample that comprises multi-spectral pixels requiring processing for unmixing. An 'unprocessed pixel' that is selected for processing is referred to as a 'first input pixel' that becomes a processed pixel after the spectral unmixing has been performed for that first input pixel. Likewise, a second pixel that is identified in the unprocessed pixels becomes a processed pixel because it can be unmixed by reusing the unmixing result obtained for the first input pixel.

In accordance with embodiments of the invention the multi-spectral unprocessed pixels of the image data are normalized before spectral unmixing. This can be executed by using a Euclidean norm, i.e. dividing the spectral intensity values of an unprocessed pixel by the length of the vector that is defined by the pixel intensity values. The Euclidean norm can be utilized as a scaling factor for normalizing to unit length. The spectral unmixing is then performed on the normalized multi-spectral unprocessed pixels. The unmixing result obtained by execution of the unmixing algorithm for the normalized first input pixel is multiplied by the scaling factor that has been used for normalizing the first input pixel, e.g. the Euclidean norm of the first input pixel, to provide the final unmixing result for the un-normalized original first input pixel. Likewise, the unmixing result which is obtained for the normalized first input pixel is reused for unmixing the second pixel by multiplying the unmixing result obtained for the normalized first input pixel by the scaling factor that has been used for normalizing the second pixel to provide the final unmixing result for the second pixel.

In accordance with embodiments of the invention the similarity criterion for identifying the second pixels that are sufficiently similar to the first input pixel for reuse of the unmixing result is a threshold value. For example, an unprocessed pixel is selected as a second pixel if the dot product of the normalized unprocessed pixel and the normalized first input pixel is below the threshold value, such as below 0.99. Hence, the search operation for identifying second pixels in the image data that are sufficiently similar to the first input pixel for reuse of the unmixing result can be performed by performing a vector multiplication of each candidate unprocessed pixel by the first input pixel after normalization and comparing the resultant dot product with the threshold value. If the dot product is below the threshold value the candidate unprocessed pixel is selected as a second pixel for which the unmixing result obtained for the first input pixel can be reused.

In accordance with an embodiment of the invention a clustering algorithm is executed on the image data to provide a set of pixel clusters where each pixel cluster contains similar pixels. A first input pixel is selected from each of the clusters and the unmixing result obtained for the first input pixel selected from one of the clusters is reused for other pixels contained in the same cluster. Suitable clustering algorithms are as such known from the prior art, cf. Jain, Anil K. Algorithms for Clustering Data, Prentice Hall Advanced Reference Series, 1988.

In accordance with embodiments of the invention an image segmentation is performed on the image data before spectral unmixing. The image data is partitioned into regions that are homogeneous with respect to one or more characteristics or features by means of medical image segmentation such that a segmented region will usually have a reduced variance of the multi-spectral unprocessed pixels contained in that region. Performing the spectral unmixing per region thus further reduces the overall computational cost and further increases speed and system throughput. In other words, a first input pixel is selected per segmented region and the search for similar second pixels is performed for each region separately in order to identify second pixels in each region that are sufficiently similar to the first input pixel of the respective region in order to allow reuse of the unmixing result. This can be parallelized by parallel processing of the segmented regions to further increase the processing speed. Suitable methods for medical image segmentation are known from the prior art, cf. Handbook of Medical Imaging, Processing and Analysis, Isaac N. Bankman, Academic Press, 2000, Chapter 5, pages 69-85.

The term 'processor' as used herein comprises a single processor with one or more processor cores and a multiple processor system that may be networked as well as a processor or processor system supporting parallel processing.

The subject disclosure presents systems and methods for speeding up a spectral unmixing process by using pixel groups. Rather than unmixing every pixel in an image, as performed by the prior art, embodiments disclosed herein perform operations including forming groups of similar pixels, and unmixing only one representative pixel from each pixel group to determine an unmixing result for other pixels in the group. The representative pixel may be one of a subset of pixels selected from the millions of unprocessed pixels in the image and input into comparison and unmixing operations. To form the group of similar pixels, a similarity metric may be based on a dot product of the normalized intensities of the unprocessed pixel and the input pixel. One of ordinary skill in the art would recognize that the similarity metric may be computed by other methods, for example, by clustering or other comparative methods. The dot product may be compared with a threshold, and if it exceeds the threshold, the pixels are determined to be similar and grouped together. The input pixels in the sampled subset may be input towards an unmixing operation, and the unmixing result for each input pixel may be applied to pre-determine the unmixing result for each matching/similar pixel in the group of matching pixels. The unmixing result for each input pixel may be used to determine the unmixing result for each matching pixel in the group of pixels associated with each input pixel. A scaling factor may be used to determine the unmixing result for each similar or matched pixel in the group. The scaling factor is based on the normalized intensity of the pixels determined during the dot product operation.

The selection and unmixing of input representative pixels and dot-product determination and threshold comparison are repeated until there are a minimum number of unmatched pixels remaining. For instance, a number of pixels that remain unmatched to input pixels may be compared with a threshold. It is determined whether or not the remaining unprocessed pixels exceed a threshold number of unprocessed pixels and, if there are a large number of unprocessed pixels, a new set of input pixels may be determined from the unprocessed pixels. If the number of remaining or unmatched pixels is smaller than the threshold, each unmatched pixel may be individually unmixed. The pixels may be unmixed using a non-negative linear least squares method. Since the numerous matched pixels need not be individually unmixed, significantly fewer unmixing operations are performed on an image, thereby speeding up the unmixing process.

In one exemplary embodiment, the subject disclosure is a non-transitory digital storage medium for storing executable instructions that are executed by a processor to perform operations including sampling an input pixel from an image comprising a plurality of unprocessed pixels, and identifying, from the plurality of unprocessed pixels, an unprocessed pixel that is similar to the input pixel, wherein an unmixing result for the input pixel is used for the similar pixel. The operations further comprise normalizing the intensity values of each pixel to a unit length, determining a similarity between the unprocessed pixel and the input pixel based on a dot product of the normalized intensities.

In another exemplary embodiment, the subject disclosure is a system for spectral unmixing, including a processor, and a memory coupled to the processor, the memory to store executable instructions that, when executed by the processor, cause the processor to perform operations including identifying a similarity between a first pixel and a second pixel from an image comprising a plurality of pixels, and unmixing the first pixel to obtain an unmixing result for the second pixel.

In yet another exemplary embodiment, the subject disclosure is a method including grouping a plurality of similar pixels from an image into a group, and unmixing a sample pixel from the plurality of similar pixels to obtain an unmixing result for the group

DETAILED DESCRIPTION OF THE SUBJECT DISCLOSURE

Figure 1:
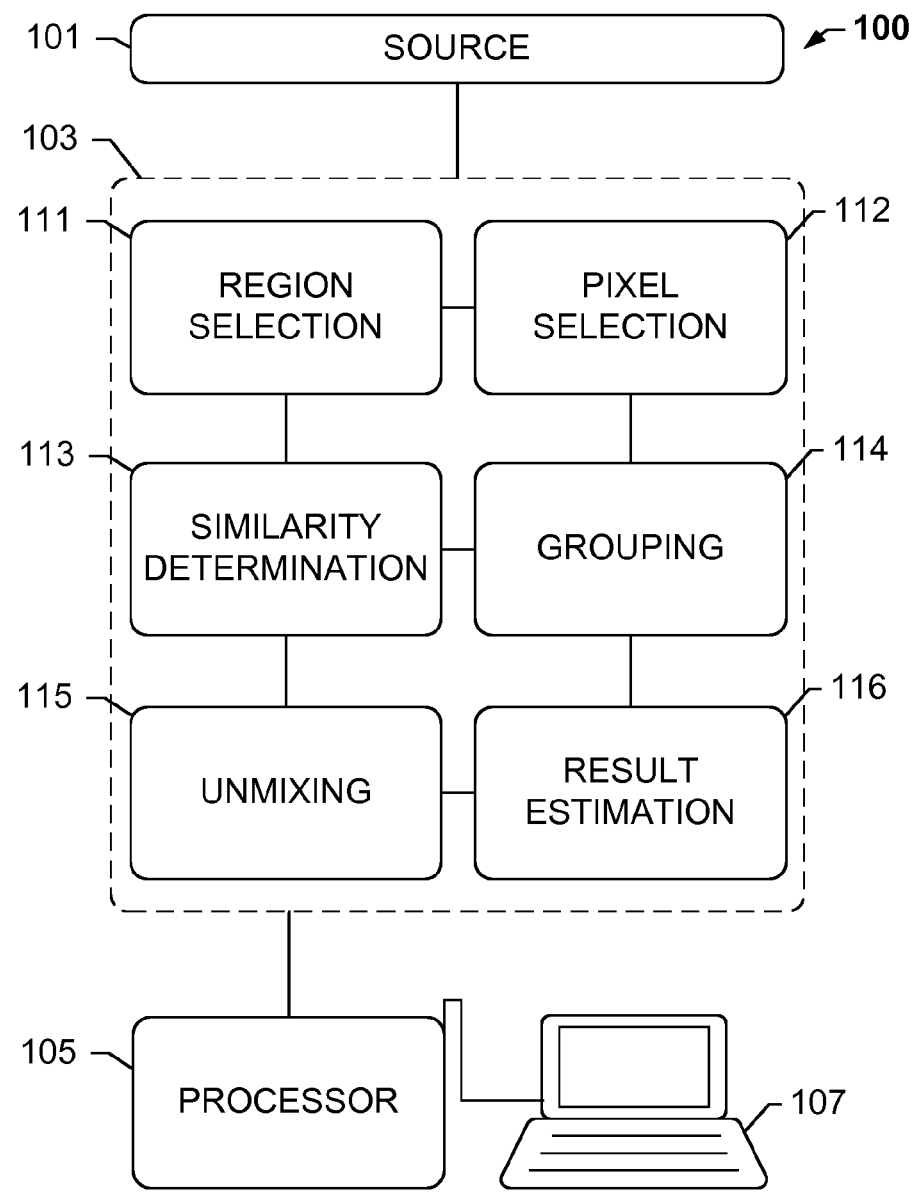
FIG. 1 shows a system for spectral unmixing using pixel grouping, according to an exemplary embodiment of the present subject disclosure.

The subject disclosure presents systems and methods for speeding up an unmixing process. Representative pixels are randomly sampled from a plurality of pixels in an image and groups of similar pixels from the plurality of pixels in an image are identified for each representative pixel. The representative pixel may be one of a subset of pixels selected from the millions of unprocessed pixels in the image. To determine the pixels that are similar to the representative pixel, a similarity metric may be computed based on a dot product of the normalized intensities of the unprocessed pixel and the representative pixel. The dot product may be compared with a threshold and, if it exceeds the threshold, the pixels are determined to be similar. For the purposes of the subject disclosure a representative pixel is hereinafter referred to as an input pixel.

Any of the unprocessed pixels in the image that are identified as being similar to the input pixel in the subset may be grouped together. Each input pixel for a group in the subset may be input into a non-negative linear least squares operation. The unmixing result for each input pixel may be used to determine the unmixing result for each matching pixel in the group of pixels associated with each input pixel. A scaling factor may be used to determine the unmixing result for each similar or matched pixel in the group. The scaling factor is based on the normalized intensity of the pixels determined during the dot product operation.

The selection of input pixels may be based on a uniform or random sampling of the image. Alternatively or in addition, input pixels may be sampled based on a region selection. A selection of different regions of the image corresponding to separate physiological structures or other characteristics may be performed, and then input pixels may be sampled from each region separately. A random selection of input pixels may include sampling, for example, 100 pixels from all the pixels comprised by the image. Alternatively, the input pixel selection may be based on the frequency of intensity values using, for example a histogram of pixel intensity values, where pixels having the highest frequency are selected. Moreover, the input pixels may be input into an unmixing operation prior to the matching process, or the unmixing may be performed after all matching pixels have been identified. A number of remaining pixels may be identified that do not match any input pixels. The input pixel selection and matching pixel identification operations may be repeated until the number of remaining or unmatched pixels is smaller than a threshold, upon which the remaining pixels may be individually unmixed. For instance, it is determined whether or not the remaining unprocessed pixels exceed a threshold number of unprocessed pixels and, if there are a large number of unprocessed pixels, a new set of input pixels may be determined from the unprocessed pixels. Resampling of unmatched input pixels may use the same or either of the alternate sampling methods described herein, in any combination.

FIG. 1 shows a system 100 for spectral unmixing using pixel grouping, according to an exemplary embodiment of the present subject disclosure. System 100 comprises a source 101 for generating a multi-channel image, for example, a multi-channel fluorescent or brightfield image with several (ten to sixteen for example) channels where each channel image is a gray-scale image, of 8 or 16-bit, corresponds to image capture from a narrow spectral band or a RGB color image with three color channels where each channel is corresponds to the particular color capture. For instance, source 101 may be a fluorescence microscope, camera, optical, scanner, CCD, or other optical component of an imaging system generating a fluorescent image, or a bright-field microscope, camera, optical scanner, or imaging system generating an RGB image. Examples of imaging systems can be, for example, any fluorescent or a brightfield microscope with spectral filter wheel or a whole slide scanner Source 101 is in communication with a memory 103, which includes a plurality of processing modules or logical operations that are executed by processor 105 coupled to interface of electronic processing device 107 that provides a user interface, including a display for displaying the unmixed image.

For instance, a sample, such as a biological specimen, may be mounted on a slide or other substrate or device for purposes of imaging by a microscope, camera, scanner, CCD, or other optical system coupled to memory 103, with analysis of images of the specimen being performed by processor 105 executing one or more of the plurality of modules stored on memory 103 in accordance with the present disclosure. The analysis may be for purposes of identification and study of the specimen. For instance, a biological or pathological system may study the specimen for biological information, such as the presence of proteins, protein fragments or other markers indicative of cancer or other disease, or for other purposes such as genomic DNA detection, messenger RNA detection, protein detection, detection of viruses, detection of genes, or other.

The specimen, for example, a tissue specimen or cytology specimen may be stained by means of application of one or more different stains that may contain one or more different quantum dots, fluorophore(s), or other stains. For example, in a fluorescent slide, the different stains may correspond to different quantum dots and/or fluorophores. The fluorophores may comprise one or more nano-crystalline semiconductor fluorophores (e.g., quantum dots), each producing a peak luminescent response in a different range of wavelengths. Quantum dots are well known, and may be commercially available from Invitrogen Corp., Evident Technologies, and others. For example, the specimen may be treated with several different quantum dots, which respectively produce a peak luminescent response at 565, 585, 605, and 655 nm. One or more of the fluorophores applied to the specimen may be organic fluorophores 14 (e.g., DAPI, Texas Red), which are well known in the art, and are described in at least commonly-owned and assigned U.S. Pat. No. 8,290, 236, the contents of which are incorporated by reference herein in their entirety. Moreover, a typical specimen is processed utilizing a staining/assay platform, which may be automated, that applies a stain, for example, a stain containing quantum dots and/or organic fluorophores to the specimen. There are a variety of commercial products on the market suitable for use as the staining/assay platform.

After preliminary tissue processing and staining, one or more digital images of the specimen may be captured at source 101 via, for instance, a scanner, CCD array spectral camera, or other imaging system that is used for imaging a slide containing a sample of a material. The slide containing the sample is subjected to a light source for illuminating the specimen at wavelengths intended to produce a luminescent response from the stain applied to the specimen. In the case of quantum dots, the light source may be a broad spectrum light source. Alternatively, the light source may comprise a narrow band light source such as a laser. An RGB brightfield image may also be captured. The optical component of the imaging system may include, for example, a digital camera, a microscope or other optical system having one or more objective lenses, and light sources, as well as a set of spectral filters. Other techniques for capturing images at different wavelengths may be used. Camera platforms suitable for imaging stained biological specimens are known in the art and commercially available from companies such as Zeiss, Canon, Applied Spectral Imaging, and others, and such platforms are readily adaptable for use in the system, methods and apparatus of this subject disclosure. The image may be supplied to memory 103, either via a cable connection between the source 101 and electronic processing device 107, via a communication network, or using any other medium that is commonly used to transfer digital information between electronic processing devices. The image may also be supplied over the network to a network server or database for storage and later retrieval by electronic processing device 107. Besides processor 105 and memory 103, electronic processing device 107 also includes user input and output devices such as a keyboard, mouse, stylus, and a display/touchscreen. As will be explained in the following discussion, processor 105 executes modules stored on memory 103, performing analysis of the image, morphological processing of the image or image data derived from such images, quantitative analysis, and display of quantitative/graphical results to a user operating electronic processing device 107.

Modules stored on memory 103 include a region selection module 111, pixel selection module 112, similarity determination module 113, grouping module 114, unmixing module 115, and result estimation module 116. The operations performed by these modules are not limited to those described herein, and the sequence, arrangement, and total number of modules may vary, with the presently described embodiment being solely for example purposes. For instance, region selection module 111 enables automated segmentation or manual delineation of the image into one or more regions. This enables subsequent operations to be performed on the same or different regions of the image, enabling efficient processing of multiplex images. Regions may be defined based on structures or features observed in the image, with separate processes being executed in parallel for each region. The custom region may be selected by the user. In some instances, a brightfield image of a neighboring section from the same tissue block is captured by a brightfield digital scanner. The brightfield image may be viewed and used to annotate specific regions, such as tumor areas. The identified areas may be used to provide a target region for scanning by a fluorescent scanner or for imaging by a camera, for example, a spectral camera. In other words, a region selected on a brightfield image of a tissue sample may be identified, and mapped to an image of an adjacent or neighboring tissue sample that has been stained with, for example, one or more fluorescent stains (e.g., an image of a multiplex stained tissue sample) to reveal further detail of the selected region(s) in the brightfield image. Separate operations may be executed in parallel on different regions, enabling efficient processing of large numbers of multiplex slides, for example, fluorescent slides.

Pixel selection module 112 is executed to select or sample input pixels from the image or region of the image. Although input pixels may be selected from different regions of the image, the usage of region selection module 111 to mark these regions is optional, and input pixels may be selected from the entire image upon receiving the image from source 101. Input pixels become part of a subset of pixels selected from the millions of unprocessed pixels in the image. The other pixels may be marked as "unprocessed." The selection of input pixels may be based on a uniform or random sampling of the image or region of the image. Input pixels may be sampled based on a frequency, i.e. a histogram may be observed, and pixels that are most likely to have similar pixels may be selected and sampled. Other methods for selecting input pixels may become evident to those having ordinary skill in the art upon reading this disclosure. Further, for the purposes of the subject disclosure, input pixels are those that are used for identification of similar pixels as performed by similarity determination module 113, or those that are unmixed by unmixing module 115, and may therefore also be referred to as "input pixels."

Similarity determination module 113 is executed to compare pixels in the image with each input pixel selected from the image, to determine whether or not they are similar. In other words, similarity determination module 113 serves for searching second pixels in the unprocessed pixels that are similar to the first input pixel. This search can be performed in all unprocessed pixels or a portion thereof, such as by limiting the search to unprocessed pixels that are in the same image segment as the first input pixel for which similar second pixels are searched. As described above, all the pixels in the image with the exception of the input pixels may be marked as unprocessed. Similarity determination module selects a first input pixel from the selected input pixels, and compares every unprocessed pixel of the image date or within a segment with the input pixel of the same segment. If an unprocessed pixel is identified as being similar to the first input pixel, it is marked as such, i.e. a second pixel, and assigned to a group associated with the first input pixel by grouping module 114. If the unprocessed pixel is not similar, it is left as unprocessed, and subsequently may be compared with other input pixels, until a similarity is identified. Unprocessed pixels that are not similar to any input pixels are processed as shown in further detail in FIGS. 2-6.

To identify similar pixels, similarity determination module 113 may generate a similarity metric for the two pixels being compared. This involves operations including computing a dot product of the intensity of the unprocessed pixel with the intensity of the input pixel, comparing the dot product with a threshold, and if the dot product exceeds the threshold, the marking the unprocessed pixel as being similar to the input pixel, or instructing grouping module 114 to group the pixels in one group associated with the input pixel or another input pixel. A magnitude of each of the unprocessed and input pixels may be normalized to a unit length prior to computing the dot product. The similarity determination is further described with reference to FIG. 3.

As mentioned above, any of the unprocessed pixels in the image that are identified as being similar to the input pixel in the subset may be grouped together. Grouping module 114 may be executed to perform grouping operations. These operations may involve tagging the similar pixel as being similar to a specific input pixel. For example, given 3 pixels of values pixel A=(3, 2, 1), pixel B=(2, 2, 2) and pixel C=(80, 50, 30) and A is the first input pixel, the intensity values of each pixel are first normalized to length one by an Euclidean L2 norm, where each pixel coordinate is a spectral intensity value, the pixel coordinates constituting a vector. The Euclidean L2 norm of such a vector is the square root of the sum of the absolute values, i.e. the pixel coordinate values, squared. For instance, an L2 norm of pixel A may be depicted as $L_A=\sqrt{3^2+2^2+1^2}=3.7417$. $L_A$ is also called as the "scaling factor" of pixel A. The normalized value $A'=A/L_A=$ (0.8018, 0.5345, 0.2673), similarly B'=(0.5774, 0.5774, 0.5774) and C'=(0.8081, 0.5051, 0.3030). Because the dot product between A' and C' is 0.9989>0.99, C is selected as a second pixel and A and C are grouped together. Since the dot product between A' and B'=0.9258<0.99, B is not put into the same group as A and is not selected as a further second pixel. Separate groups for each input pixel may be generated, with the other similar pixels that are identified as being similar to said each input pixel by similarity determination module 113 being tagged by grouping module 114 as part of the group. A group of matching pixels may subsequently be processed to determine an unmixing result for each pixel in the entire group based on a single unmixing result of the input pixel.

A spectral unmixing module 115 may be executed to unmix the input pixel, or any threshold number of remaining unprocessed pixels as further described below. A non-negative linear least-squares operation may be performed as an unmixing algorithm for separating the component fluorescent channels in each pixel. A suitable algorithm is described in C. L. Lawson and R. J. Hanson, "Solving least squares Problems", Prentice Hall, 1974, Chapter 23, p. 161. For instance, each pixel may comprise a mixture of component spectra including one or more quantum dots representing target structures, in addition to broadband signals such as DAPI and autofluorescence, as described above. The unmixing may use reference spectra retrieved from a control image or estimated from the image under observation. Spectral unmixing module 115 unmixes the component signals of each input pixel, enabling retrieval and analysis of stain-specific channels, such as blood vessel channels and lymphatic vessel channels. As described herein, the spectral unmixing operation is processor-intensive and, therefore, a single unmixing result for an input signal may be used to estimate unmixing results for a corresponding plurality or group of matched pixels without having to unmix all the pixels in the group.

The result estimation is performed by result estimation module 116 to scale back the normalized pixels to the actual pixel values. The scaling factor may be determined by similarity determination module 113 as part of the normalization for each pixel. As in the example of intensity values of a pixel A=(3, 2, 1), when normalized to length one, results in A'=(0.8018, 0.5345, 0.2673) with a scaling factor $L_A$=3.7417. The scaling factor is multiplied by the unmixing result of the normalized pixel A' to get the actual final unmixing result for pixel A. For example, if the unmixing result $U_A$ of A' is $U_A$=(0.5,0.1), the final unmixing result $U_a$ of pixel A will be $U_a=U_A \times L_A$=(0.1852,0.3742). Likewise, for obtaining the final unmixing result $U_c$ of pixel C which is determined to be sufficiently similar to pixel A and which is grouped with pixel A (cf. section 0044), the unmixing result $U_A$ is reused by multiplying $U_A$ with the Euclidean norm $L_C$ of pixel C which provides the final unmixing result $U_c$ for pixel C without re-execution of the unmixing algorithm, i.e.

$$U_c=U_A \times L_C$$

This simple operation saves processing resources versus separately unmixing every pixel in the image. Results determined by result estimation module 116 may be output to a user or operator of terminal of the electronic processing device 107, or may be compiled in a report generated by processor 105 and transmitted to another electronic processing device across a network, or saved in a file.

As described above, the modules include logic that is executed by processor 105. "Logic", as used herein and throughout this disclosure, refers to any information having the form of instruction signals and/or data that may be applied to affect the operation of a processor. Software is one example of such logic. Examples of processors are microprocessors, digital signal processors, controllers and microcontrollers, etc. Logic may be formed from processor-executable instructions stored on a non-transitory digital storage medium such as memory 103, which includes including random access memory (RAM), read-only memories (ROM), erasable/electrically erasable programmable read-only memories (EPROMS/EEPROMS), flash memories, etc. Logic may also comprise digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

Figure 2:
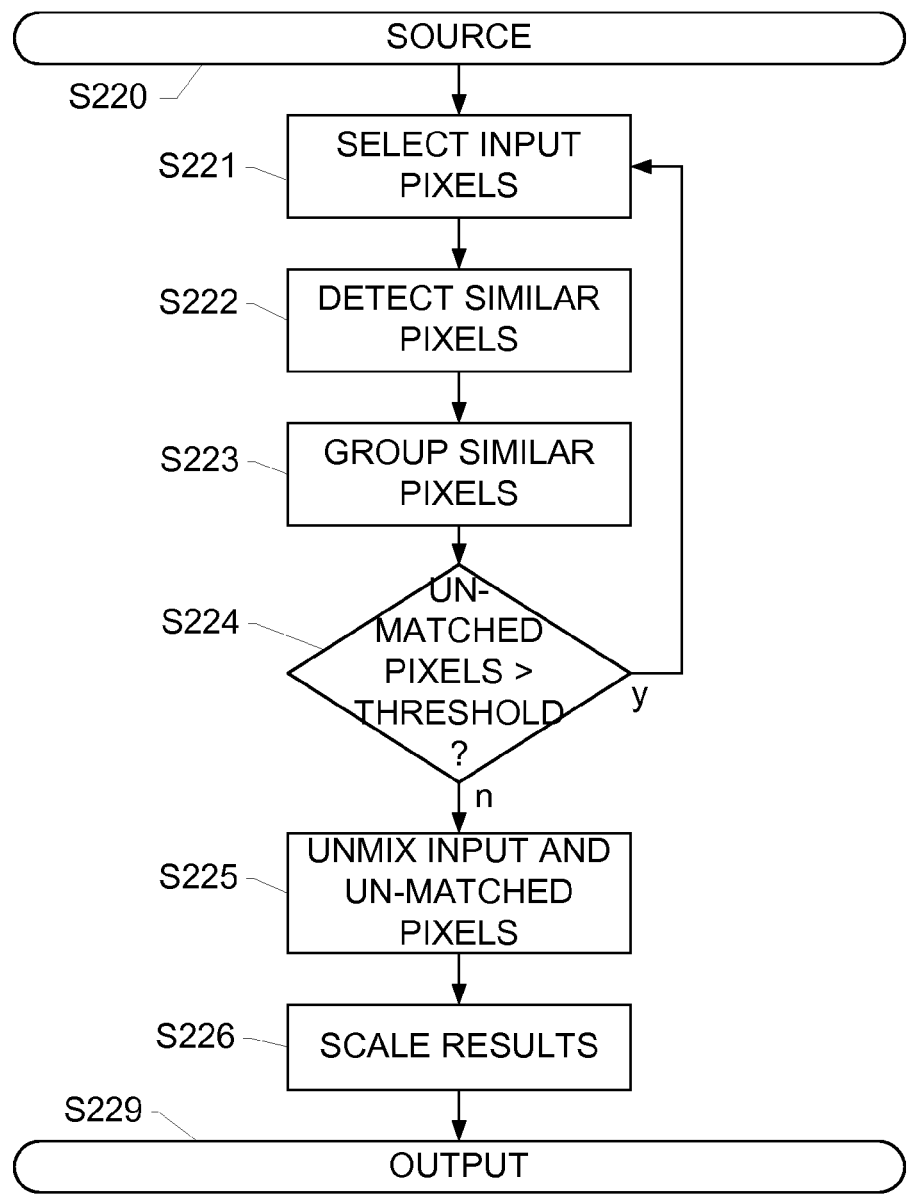
FIG. 2 shows a method for spectral unmixing using pixel grouping, according to an exemplary embodiment of the present subject disclosure.

FIG. 2 shows a method for spectral unmixing using pixel grouping, according to an exemplary embodiment of the present subject disclosure. The method of FIG. 2 may be performed by an electronic processing device executing modules similar to those depicted in FIG. 1, with the understanding that the method steps described herein need not be performed in the described order, and may be executed in any sequence understandable by a person having ordinary skill in the art in light of the subject disclosure. The method begins (S220) with an image of a specimen or image data that has been received from a source as described in FIGS. 1A-C, or any source that can capture image content at a range of frequencies, enabling hyperspectral or fluorescence imaging wherein the image energy is captured at multiple frequencies. The specimen may be stained by means of application of one or more different stains that are illuminated by a light source. Subsequent to the staining, an image is captured by a detection device, for example, a spectral camera, as described above. The image is supplied to an electronic processing device that executes logical instructions stored on a memory for performing the operations described in the exemplary method.

From the image, input pixels may be selected, sampled, or determined and marked (S221). The input pixels may be selected uniformly from the image, or from regions of the image that are determined based on an automatic or manual detection of structures or features observed in the image, e.g. by medical image segmentation. The selection of input pixels may be based on a uniform or random sampling of the image or region of the image. Input pixels may be sampled based on a frequency, i.e. a histogram may be observed, and pixels that are most likely to have similar pixels may be selected and sampled. Uniform sampling of input pixels may be performed by selecting up to one pixel in every square block of k×k pixels. For example, an image of 500 by 500 pixels may be divided into 2500 blocks of 10×10 pixels each. A single representative pixel may be selected to be used as the input pixel, uniformly or randomly from each 10×10 block, resulting in a total of 2500 input pixels that are unmixed to represent unmixing results for any pixels similar to these input pixels. Other methods for selecting input pixels may become evident to those having ordinary skill in the art upon reading this disclosure.

All remaining pixels in the image that are as yet unprocessed may be compared with one or more input pixels from the representative set to identify whether or not they are similar (S222). As described above, all the pixels in the image with the exception of the input pixels may be initially marked as unprocessed. A first input pixel from the set of input pixels may be selected and compared with every unprocessed pixel for searching similar second pixels. If an unprocessed pixel is identified as being similar to the first input pixel, it is marked as such. This similarity determination is further described with reference to FIG. 3. The similar pixel may be assigned to a group associated with the first input pixel (S223). Moreover, any of the unprocessed pixels in the image that are identified as being similar to the input pixel in the subset may be grouped together (S223). These operations may involve tagging the similar pixels as being similar to a specific input pixel. Separate groups for each input pixel may be generated, with the corresponding similar pixels being tagged as part of the group.

Further, a number of pixels may be left unmatched, or identified as not being similar to any of the input pixels. It is determined (S224) whether or not the remaining unprocessed pixels exceed a threshold number of unprocessed pixels and, if there is a large number of unprocessed pixels, a new set of input pixels may be determined from the unprocessed pixels (S221). For instance, given 2500 input pixels resulting in 2500 unmixing operations, a threshold number of unprocessed pixels that are individually unmixed may be 1000. The threshold number of unmixed pixels may be a percentage of total input pixels, such as a half or a third. Subsequently, input pixel selection (S221), matching (S222), and grouping (S223) operations may be repeated until the number of remaining or unmatched pixels is smaller than a processing threshold, upon which the remaining pixels may be individually unmixed along with the input pixels (S225).

As described above, an unmixing result for each input pixel may be used to represent the unmixing result for every matching pixel in the group associated with said each input pixel. A non-negative linear least-squares operation may be performed for separating the component channels in each pixel. Any remaining unmatched pixels that are lower than a threshold number of unmatched pixels may also be unmixed. For each input pixel, unmixing results for matching pixels may be determined by scaling the unmixing result for the particular input pixel by a scaling factor (S226). The scaling factor may be determined during the normalization for each pixel in step S222. The matching pixel may be similar or identical to the input pixel except for a scaling factor. As in the example of intensity values of a pixel A=(3, 2, 1), when normalized to length one, results in A'=(0.8018, 0.5345, 0.2673) with a scaling factor $L_A$=3.7417. The scaling factor is multiplied by the unmixing result of the normalized input pixel to determine the unmixing result for the matching pixel. For example, if normalized pixel C'= (0.8081, 0.5051, 0.3030) is a matching representative pixel of A' and the unmixing result of A' is $U_A$=(0.5,0.1), then the final unmixing result $U_c$ will simply take the same value of $U_A$ but with the scaling factor $L_C$, hence $U_c=U_A \times L_C$.

This scaling factor multiplication is performed for every similar pixel in the group of matching pixels. This simple operation saves processing resources versus separately unmixing every pixel in the image. Results may be output (S229) to a user, or may be compiled in a report and transmitted to another electronic processing device across a network, or saved in a file.

Figure 3:
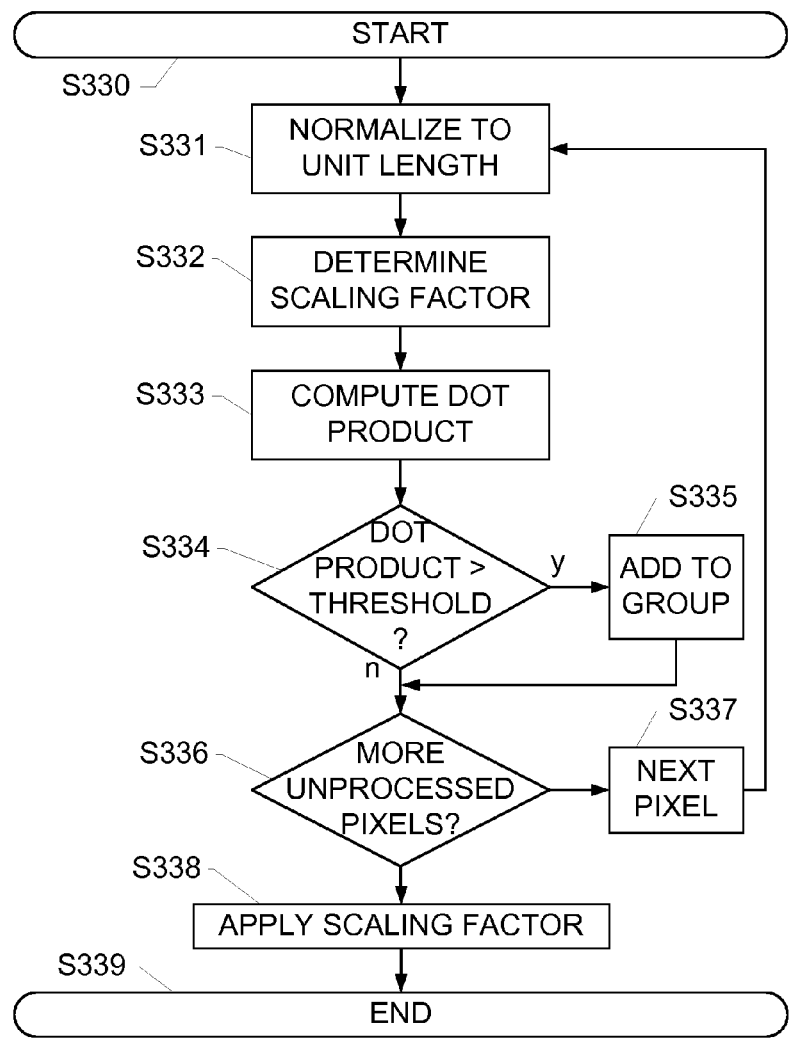
FIG. 3 shows a method for determining similar pixels, according to an exemplary embodiment of the present subject disclosure.

FIG. 3 shows a method for determining similar pixels, according to an exemplary embodiment of the present subject disclosure. The method of FIG. 3 may be performed by a electronic processing device executing modules similar to those depicted in FIG. 1, with the understanding that the method steps described herein need not be performed in the described order, and may be executed in any sequence understandable by a person having ordinary skill in the art in light of the subject disclosure. The method begins (S330) with a first input pixel and a candidate second pixel. The first pixel may be an input pixel that is selected to represent a group of similar pixels, as described herein. The candidate second pixel may be an unprocessed pixel among a plurality of unprocessed pixels that is compared with the first pixel to determine whether or not the two pixels are similar. At first, both pixels are normalized to a value of one (S331). For instance, the vector magnitude for each pixel is scaled by a scaling factor to a magnitude of 1. This step may be performed for the pixels being compared, or for all pixels in an image or region of the image prior to beginning the method. In either case, the scaling factors for the pixels may also be determined at this time (S332). The scaling factor may be used to determine the final unmixing results for the similar or matched pixel.

A similarity metric for the two pixels is established by computing a dot product between the two pixels (S333) and comparing the dot product with a threshold (S334). The dot product is a simple vector operation, and uses the normalized values for each pixel, resulting in a dot product value that ranges between 0 and 1, with 0 identifying a perfectly dissimilar pixel, and 1 identifying a perfectly similar pixel. As shown in the examples above, a dot product that is greater than 0.99 may be considered to be sufficiently similar, thereby being able to use an unmixing result of the input pixel to represent the unprocessed pixel. Thus, an example threshold for comparison in step S334 may be 0.99. If the similarity exceeds the threshold, the candidate second pixel is determined to be a second pixel that is sufficiently similar to the first input pixel and may be added to a group corresponding to the input pixel (S335). The group designation may include tagging the pixel, and removing any tag or designation that marks the pixel as unprocessed. Consequently, the pixel would not be used in any further comparisons, thereby reducing the number of unprocessed pixels, and speeding up the process. If, however, the dot product fails to exceed the threshold (i.e. is lower than 0.99), nothing happens, the candidate second pixel may remain marked as "unprocessed", and the method determines if there are any additional unprocessed pixels to be identified as being similar with the input pixel (S336). If additional pixels exist, the next pixel is selected (S337), and the method repeats the normalizing, scaling, and similarity identification operations. As described earlier, the normalizing and scaling may already have been performed, in which case the next pixel is selected (S337) and the dot product computed with the input pixel (S333). Other sequences of operations may be evident to those having ordinary skill in the art in light of this disclosure. When all unprocessed pixels are accounted for, the method may end (S339).

Figure 4:
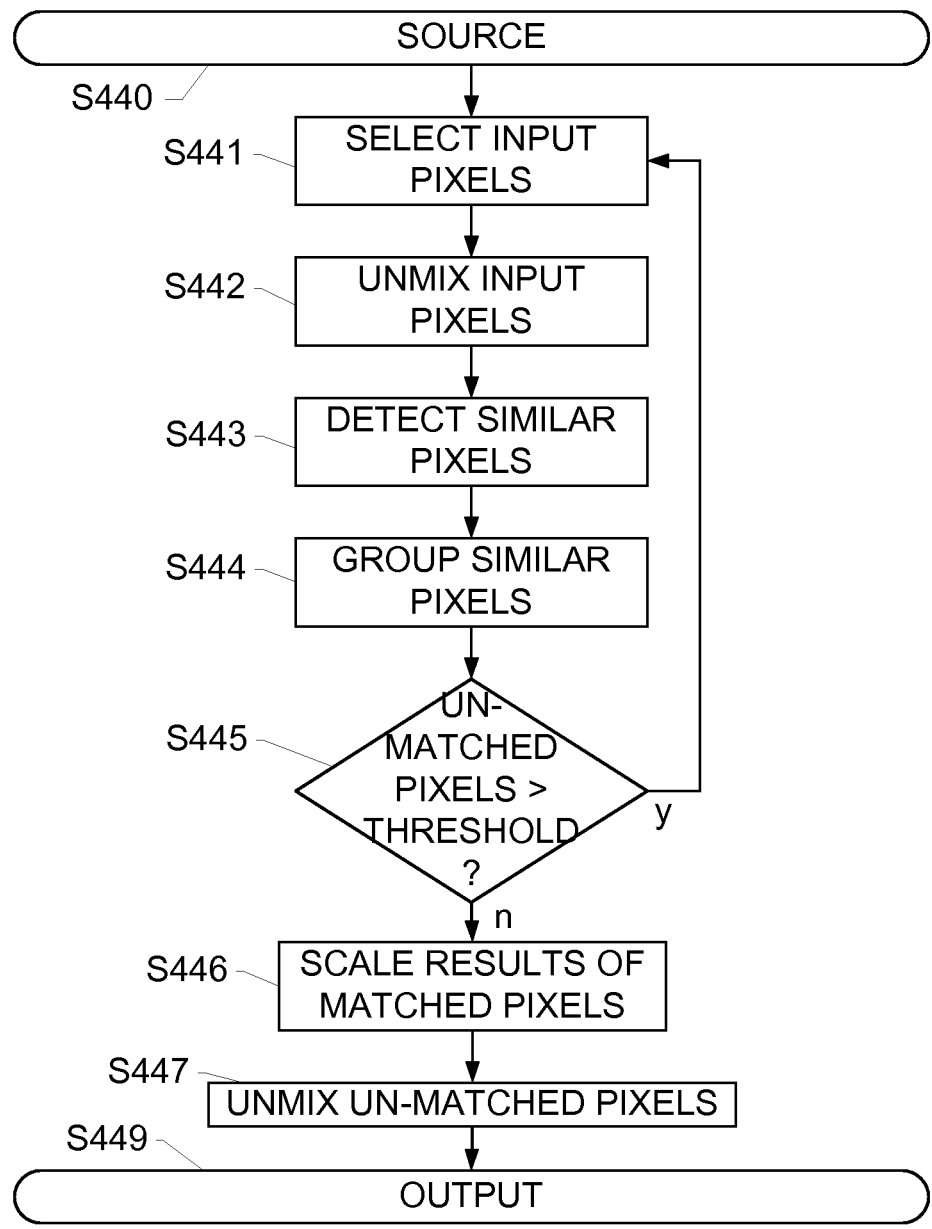
FIG. 4 shows a method for spectral unmixing using pixel grouping, according to an exemplary embodiment of the present subject disclosure.

FIG. 4 shows another method for spectral unmixing using pixel grouping, according to an exemplary embodiment of the present subject disclosure. The method of FIG. 4 may be performed by a electronic processing device executing modules similar to those depicted in FIG. 1, with the understanding that the method steps described herein need not be performed in the described order, and may be executed in any sequence understandable by a person having ordinary skill in the art in light of the subject disclosure. The method begins (S440) with an image of a specimen or image data that has been received from a source, as shown in FIG. 1, such as a combination of a microscope and a spectral camera. From the image, input pixels may be selected, sampled, or determined and marked as a set of input pixels (S441). The input pixels may be selected uniformly from the image, or from regions of the image that are determined based on an automatic or manual detection of structures or features observed in the image.

This method differs from that in FIG. 2 in that the input pixels are all unmixed (S442) prior to any similarity or grouping operations, versus unmixing the input pixels after similar pixels are identified. In this case, unprocessed pixels may be compared with one or more input pixels from the representative set to determine whether or not they are similar (S443), with similar pixels being assigned to a group associated with the input pixel (S444). A number of pixels that are unmatched or determined to be not similar to any of the input pixels are compared with a threshold number of unprocessed pixels (S445). If the number is larger than the threshold, a fresh set of input pixels is selected (S441) and the method is repeated. If there are a sufficiently small number of unprocessed pixels remaining, the unmixing results of step S442 are used to determine unmixing results for each matching pixel (S446). The scaling factor may be determined during the normalization for each pixel. Unprocessed pixels are individually unmixed (S447), and the results are output (S449).

Figure 5:
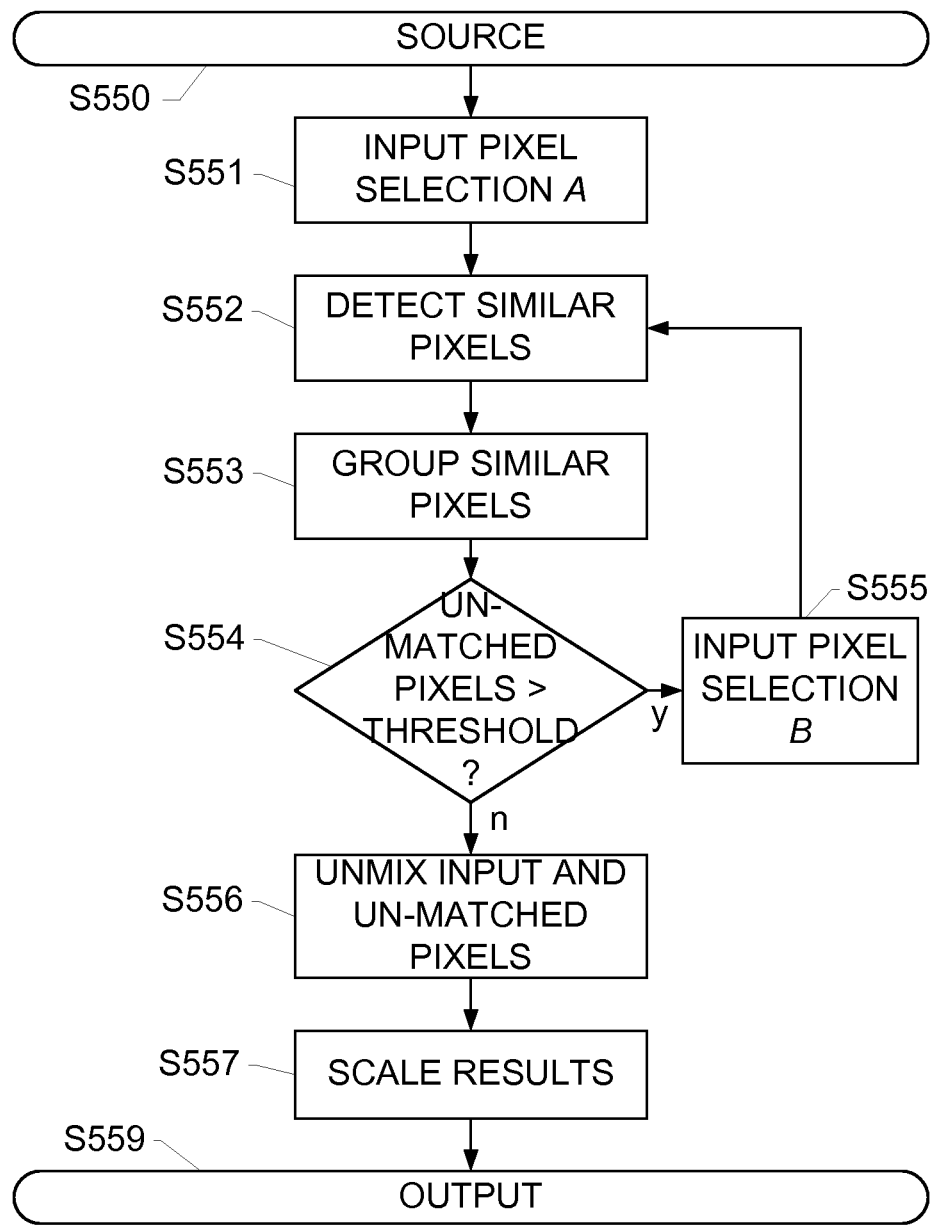
FIG. 5 shows a method for spectral unmixing using alternate pixel selections, according to an exemplary embodiment of the present subject disclosure.

FIG. 5 shows a method for spectral unmixing using alternate pixel selections, according to an exemplary embodiment of the present subject disclosure. The method of FIG. 5 may be performed by an electronic processing device executing modules similar to those depicted in FIG. 1, with the understanding that the method steps described herein need not be performed in the described order, and may be executed in any sequence understandable by a person having ordinary skill in the art in light of the subject disclosure. The method begins (S550) with an image of a specimen or image data that has been received from a source such as a combination of a microscope and a spectral camera. From the image, a first set of input pixels may be selected, sampled, or determined and marked (S551). The input pixels may be selected uniformly from the image, or from regions of the image that are determined based on an automatic or manual detection of structures or features observed in the image, or based on a histogram of intensity values of the most-frequently occurring pixels, or any other method. Similar pixels to the input pixels are detected and grouped (S552, S553) as described above, and a number of unprocessed pixels monitored.

The difference in this embodiment versus those of FIGS. 2 and 4 is that in this case, a number of unprocessed pixels that is higher than a threshold (S554) results in a selection of a second set of input pixels using a different method than in step S551. For instance, input pixel selection A (S551) may utilize a histogram of pixel values to determine pixels that are most likely to have other pixels in common. Subsequently, given a higher-than-threshold number of unprocessed pixels, the next set of input pixel selection B (S555) may use a uniform selection of input pixels. In alternate embodiments, pixel selection A is based on regions delineated by structures detected in the image, and pixel selection B is based on a uniform or other type of selection. Other combinations may become apparent to those having ordinary skill in the art in light of this disclosure. Subsequent operations such as unmixing pixels (S556) and scaling results (S557) are as described in other embodiments.

Figure 6:
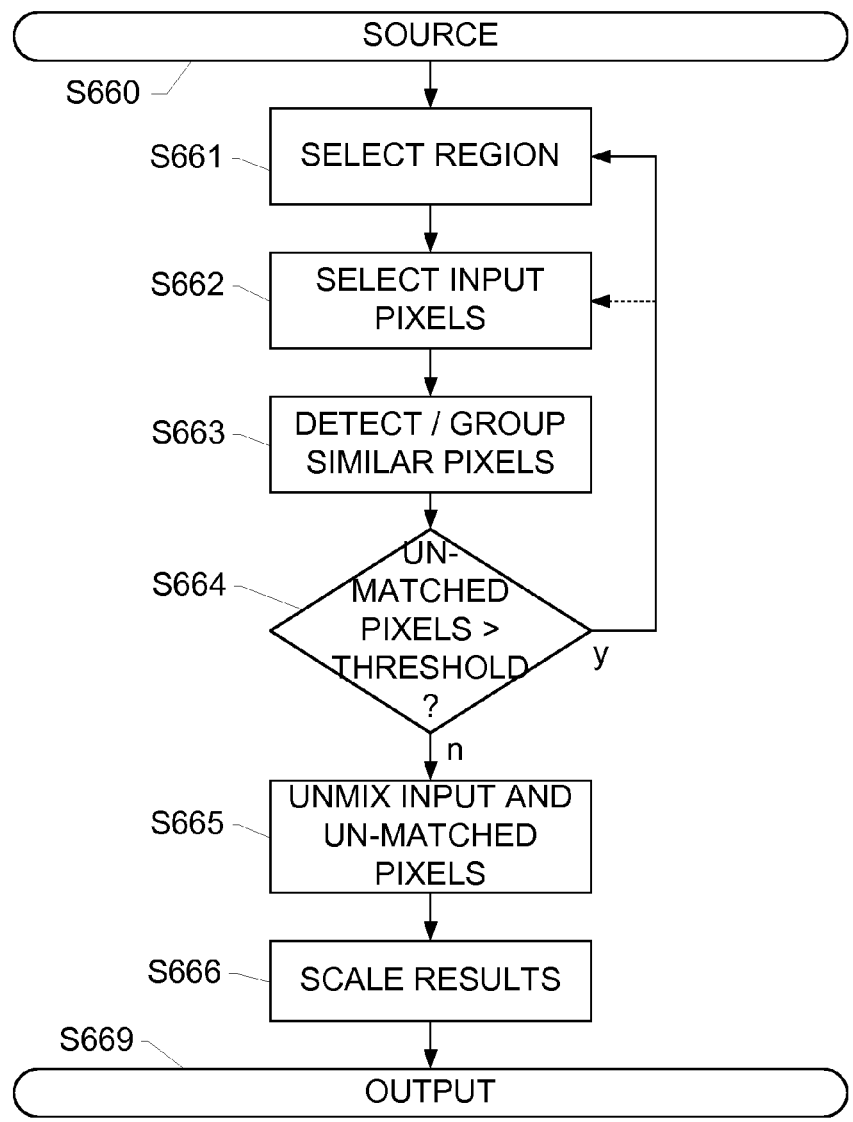
FIG. 6 shows a method for spectral unmixing using region selection, according to an exemplary embodiment of the present subject disclosure.

FIG. 6 shows a method for spectral unmixing using region selection, according to an exemplary embodiment of the present subject disclosure. The method of FIG. 6 may be performed by an electronic processing device executing modules similar to those depicted in FIG. 1, with the understanding that the method steps described herein need not be performed in the described order, and may be executed in any sequence understandable by a person having ordinary skill in the art in light of the subject disclosure. The method begins (S660) with an image of a specimen or image data that has been received from a source such as a fluorescence microscope associated with or including a scanner or spectral camera, or any source that can capture image content at a range of frequencies. From the image, a region of the image may be selected for analysis (S661). The regions may be determined based on an automatic or manual detection of structures or features observed in the image, such as by automatic medical image segmentation. For instance, a user interface may be provided to manually select or to confirm an automatic selection of regions based on tissue type or heterogeneity observed in the image under analysis. For the selected region, input pixels may be selected, sampled, or determined and marked as a set of input pixels (S662). The selection of input pixels may be based on a uniform or random sampling of the region, or a histogram of pixels within the region, or any other method.

Similarity determination (S663) and threshold number of unprocessed pixel determination (S664) may occur as described above. However, upon determining an excessive number of unprocessed pixels, the method may select a different region (S661), or make a new selection of input pixels (S662). This dynamic region selection based on a number of unmatched pixels enables efficient identification of similar pixels for different regions of the image, versus uniform input pixel selection in situations where the tissue properties are not uniform. Apart from this novel matching process, the unmixing and scaling operations S665-S666 remain as described herein, with any results being output to a user or compiled in a report (S669).

Figure 7A:
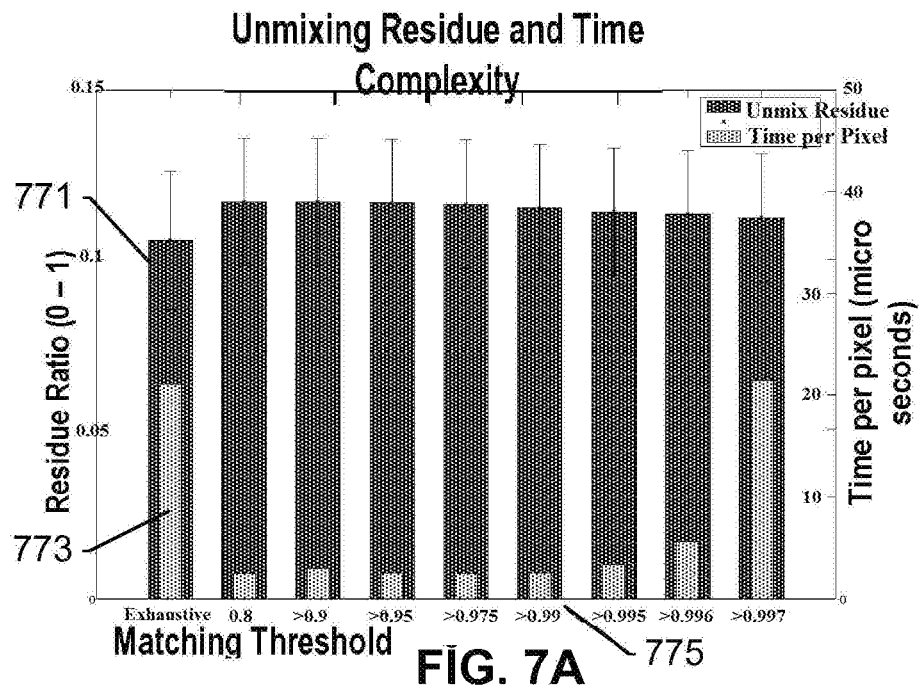
FIGS. 7A and 7B show results of a spectral unmixing operation using pixel grouping, according to an exemplary embodiment of the present subject disclosure.
Figure 7B:
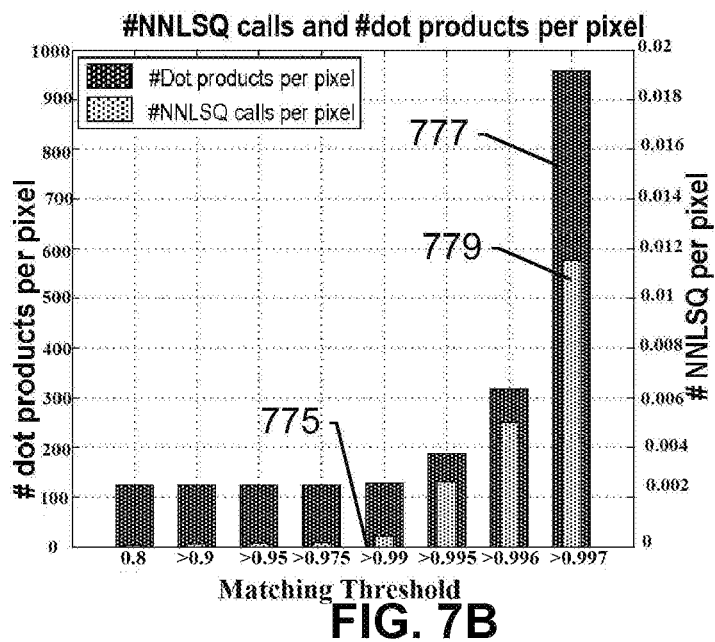

FIGS. 7A and 7B show results of a spectral unmixing operation using pixel grouping, according to an exemplary embodiment of the present subject disclosure. Here we measure the quality of unmixing by "unmixing residue", which is defined by the difference between the reconstructed pixel from unmixed result and the original pixel. The difference is a ratio, that is, 0.01 means one percent difference. We also measure the time spent per pixel. The time spent per pixel is determined by dividing the total time to unmix the image by the total number of pixels. Referring to FIG. 7A, a chart is shown depicting unmixing residue 771 and time spent per pixel 773 for a plurality of matching thresholds, ranging from an exhaustive search (manually unmixing all pixels as is performed by the prior art), to a low threshold of >0.8, to a high threshold of >0.997. The column of "exhaustive" is the prior art without speedup. It gets the lowest residue but takes the longest time. If a high similarity threshold like 0.997 is used, most pixels will not find a match, and have to go through the exhaustive unmixing. On the other hand, if a low threshold like 0.8 is used, the residue error will be higher. An optimal trade-off is a matching threshold approximately >0.99, shown in graph 775, which enables a small amount of time spent per pixel, and provide comparable unmixing residues.

Referring to FIG. 7B, the chart depicts in more details how time were spent on two types of calculations when different similarity thresholds are used. There are two types of calculations that take most of time. First are the prior art non-negative least square solver calls which are applied on the representative pixels and unmixed pixels. The second are the dot product spent to search for matching pixels. Again, 0.99 appears to be an optimal threshold, as shown in graph 775, however any suitable matching threshold may be used based on these results of the novel methods described herein.

The matching operations described herein may be based on a linear scan, i.e. matching all remaining pixels with the input pixels. Alternatively or in addition, the unmixed pixels may be organized into some structure, enabling faster matching. Hashing the unprocessed pixels using a variety of methods may reduce the time complexity from O(n) to O(log(n)), where n is the number of pixels. For example, an stl::map command in C++ may be executed to generate a tree-like structure, matching pixels at the root first, up to a height of the structure. A compare operator may be defined to create a strict weak ordering. Given a pixel with 16 channels, the operator may order channel 1 to channel 16 as the most important bit to the least important bit, and quantize each channel by scaling it up with a factor and then rounding to an integer. Alternatively or in addition, a binary tree based on a dot product may be constructed with matching being performed on either side of the tree. This may be constructed by partitioning the pixels based on their dot product output with a pivot pixel that is selected using heuristics that minimize the correlation with previous pivots. The results of each of these hashing operations may vary based on the image and other conditions.

The disclosed operations may be performed on the same or different regions of the image, or the entire image repeatedly, with custom regions being defined based on structures or features observed in the image, and separate operations being executed in parallel on different regions, enabling efficient processing of large numbers of multiplex fluorescent slides. Moreover, besides medical applications such as anatomical or clinical pathology, prostrate/lung cancer diagnosis, etc., the same methods may be performed to analyze other types of samples such as remote sensing of geologic or astronomical data, etc. Images may be further refined by eliminating known or obvious sources of noise by, for instance, being compared to known or ideal sets of signals from similar materials. Other refinement processes include adjusting a minimum or a maximum of intensities to highlight a specific range and eliminating signals outside the range, adjusting a contrast to see a more dynamic range, and other imaging operations. For large or multiple slide/image analysis, or for analyzing one or more image cubes, the operations described herein may be ported into a hardware graphics processing unit (GPU), enabling a multi-threaded parallel implementation.

Electronic processing devices typically include known components, such as a processor, an operating system, system memory, memory storage devices, input-output controllers, input-output devices, and display devices. It will also be understood by those of ordinary skill in the relevant art that there are many possible configurations and components of a electronic processing device and may also include cache memory, a data backup unit, and many other devices. Examples of input devices include a keyboard, a cursor control devices (e.g., a mouse), a microphone, a scanner, and so forth. Examples of output devices include a display device (e.g., a monitor or projector), speakers, a printer, a network card, and so forth. Display devices may include display devices that provide visual information, this information typically may be logically and/or physically organized as an array of pixels. An interface controller may also be included that may comprise any of a variety of known or future software programs for providing input and output interfaces. For example, interfaces may include what are generally referred to as "Graphical User Interfaces" (often referred to as GUI's) that provide one or more graphical representations to a user. Interfaces are typically enabled to accept user inputs using means of selection or input known to those of ordinary skill in the related art. The interface may also be a touch screen device. In the same or alternative embodiments, applications on an electronic processing device may employ an interface that includes what are referred to as "command line interfaces" (often referred to as CLI's). CLI's typically provide a text based interaction between an application and a user. Typically, command line interfaces present output and receive input as lines of text through display devices. For example, some implementations may include what are referred to as a "shell" such as Unix Shells known to those of ordinary skill in the related art, or Microsoft Windows Powershell that employs object-oriented type programming architectures such as the Microsoft .NET framework.

Those of ordinary skill in the related art will appreciate that interfaces may include one or more GUI's, CLI's or a combination thereof.

A processor may include a commercially available processor such as a Celeron, Core, or Pentium processor made by Intel Corporation, a SPARC processor made by Sun Microsystems, an Athlon, Sempron, Phenom, or Opteron processor made by AMD Corporation, or it may be one of other processors that are or will become available. Some embodiments of a processor may include what is referred to as multi-core processor and/or be enabled to employ parallel processing technology in a single or multi-core configuration. For example, a multi-core architecture typically comprises two or more processor "execution cores". In the present example, each execution core may perform as an independent processor that enables parallel execution of multiple threads. In addition, those of ordinary skill in the related will appreciate that a processor may be configured in what is generally referred to as 32 or 64 bit architectures, or other architectural configurations now known or that may be developed in the future.

A processor typically executes an operating system, which may be, for example, a Windows type operating system from the Microsoft Corporation; the Mac OS X operating system from Apple Computer Corp.; a Unix or Linux-type operating system available from many vendors or what is referred to as an open source; another or a future operating system; or some combination thereof. An operating system interfaces with firmware and hardware in a well-known manner, and facilitates the processor in coordinating and executing the functions of various machine executable programs that may be written in a variety of programming languages. An operating system, typically in cooperation with a processor, coordinates and executes functions of the other components of an electronic processing device. An operating system also provides scheduling, input-output control, file and data management, memory management, and communication control and related services, all in accordance with known techniques.

System memory may include any of a variety of known or future memory storage devices that can be used to store the desired information and that can be accessed by an electronic processing device. Digital storage media may include volatile and non-volatile, removable and non-removable media implemented in any method or technology for storage of information such as machine executable instructions, data structures, program modules, or other data. Examples include any commonly available random access memory (RAM), read-only memory (ROM), electronically erasable programmable read-only memory (EEPROM), digital versatile disks (DVD), magnetic medium, such as a resident hard disk or tape, an optical medium such as a read and write compact disc, or other memory storage device. Memory storage devices may include any of a variety of known or future devices, including a compact disk drive, a tape drive, a removable hard disk drive, USB or flash drive, or a diskette drive. Such types of memory storage devices typically read from, and/or write to, a program storage medium such as, respectively, a compact disk, magnetic tape, removable hard disk, USB or flash drive, or floppy diskette. Any of these program storage media, or others now in use or that may later be developed, may be considered a digital storage medium or computer program product. As will be appreciated, these program storage media typically store a software program and/or data. Software programs, also called control logic, typically are stored in system memory and/or the program storage device used in conjunction with memory storage device. In some embodiments, a digital storage medium is described comprising a medium that is usable by an electronic processing device, such as a processor, having control logic (software program, including program code) stored therein. The control logic, when executed by a processor, causes the processor to perform functions described herein. In other embodiments, some functions are implemented primarily in hardware using, for example, a hardware state machine Implementation of the hardware state machine so as to perform the functions described herein will be apparent to those skilled in the relevant arts. Input-output controllers could include any of a variety of known devices for accepting and processing information from a user, whether a human or a machine, whether local or remote. Such devices include, for example, modem cards, wireless cards, network interface cards, sound cards, or other types of controllers for any of a variety of known input devices. Output controllers could include controllers for any of a variety of known display devices for presenting information to a user, whether a human or a machine, whether local or remote. In the presently described embodiment, the functional elements of an electronic processing device communicate with each other via a system bus. Some embodiments of an electronic processing device may communicate with some functional elements using network or other types of remote communications. As will be evident to those skilled in the relevant art, an instrument control and/or a data processing application, if implemented in software, may be loaded into and executed from system memory and/or a memory storage device. All or portions of the instrument control and/or data processing applications may also reside in a read-only memory or similar device of the memory storage device, such devices not requiring that the instrument control and/or data processing applications first be loaded through input-output controllers. It will be understood by those skilled in the relevant art that the instrument control and/or data processing applications, or portions of it, may be loaded by a processor, in a known manner into system memory, or cache memory, or both, as advantageous for execution. Also, an electronic processing device may include one or more library files, experiment data files, and an internet client stored in system memory. For example, experiment data could include data related to one or more experiments or assays, such as detected signal values, or other values associated with one or more sequencing by synthesis (SBS) experiments or processes. Additionally, an internet client may include an application enabled to access a remote service on another electronic processing device using a network and may for instance comprise what are generally referred to as "Web Browsers". In the present example, some commonly employed web browsers include Microsoft Internet Explorer available from Microsoft Corporation, Mozilla Firefox from the Mozilla Corporation, Safari from Apple Computer Corp., Google Chrome from the Google Corporation, or other type of web browser currently known in the art or to be developed in the future. Also, in the same or other embodiments an internet client may include, or could be an element of, specialized software applications enabled to access remote information via a network such as a data processing application for biological applications.

A network may include one or more of the many various types of networks well known to those of ordinary skill in the art. For example, a network may include a local or wide area network that may employ what is commonly referred to as a TCP/IP protocol suite to communicate. A network may include a network comprising a worldwide system of interconnected communication networks that is commonly referred to as the internet, or could also include various intranet architectures. Those of ordinary skill in the related arts will also appreciate that some users in networked environments may prefer to employ what are generally referred to as "firewalls" (also sometimes referred to as Packet Filters, or Border Protection Devices) to control information traffic to and from hardware and/or software systems. For example, firewalls may comprise hardware or software elements or some combination thereof and are typically designed to enforce security policies put in place by users, such as for instance network administrators, etc.

The foregoing disclosure of the exemplary embodiments of the present subject disclosure has been presented for purposes of illustration and description. It is not intended to be exhaustive or to limit the subject disclosure to the precise forms disclosed. Many variations and modifications of the embodiments described herein will be apparent to one of ordinary skill in the art in light of the above disclosure. The scope of the subject disclosure is to be defined only by the claims appended hereto, and by their equivalents. Further, in describing representative embodiments of the present subject disclosure, the specification may have presented the method and/or process of the present subject disclosure as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present subject disclosure should not be limited to the performance of their steps in the order written, and one skilled in the art can readily appreciate that the sequences may be varied and still remain within the spirit and scope of the present subject disclosure.

LIST OF REFERENCE NUMERALS 100 system (imaging system)
101 source (optical component, microscope)
103 memory
105 processor
107 interface
103 digital storage medium
107 electronic processing device
111 region selection module
112 pixel selection module
113 similarity determination module
114 grouping module
115 unmixing module
116 result estimation module
771 unmixing residue
773 time spent per pixel
775 graph
777 dot products per pixel
779 NNLSQ calls per pixel

What is claimed is:
1. A method of imaging a biological tissue sample, the method comprising:
acquiring image data from the biological tissue sample, the image data comprising a plurality of multi-spectral unprocessed pixels;
performing a spectral unmixing of the plurality of multi-spectral unprocessed pixels, wherein performing the spectral unmixing comprises:
selecting a first input pixel from the image data,
processing the first input pixel with an unmixing algorithm to generate an unmixing result for the first input pixel,
selecting, from the plurality of multi-spectral unprocessed pixels, a second pixel that meets a predefined similarity criterion with respect to the first input pixel, and
reusing the unmixing result obtained for the first input pixel for unmixing the second pixel without processing the second input pixel with the unmixing algorithm; and
outputting an output image of the biological tissue comprising a first unmixed pixel corresponding to the first input pixel and a second unmixed pixel corresponding to the second pixel.

2. The method of claim 1, wherein performing the spectral unmixing further comprises:
normalizing the first input pixel by determining a first scaling factor and
normalizing the first input pixel using the first scaling factor; and
determining a second scaling factor for normalizing the second pixel;
wherein:
the unmixing algorithm is applied to the normalized first input pixel to provide the unmixing result,
the unmixing result is multiplied by the first scaling factor which provides the first unmixed pixel, and
the unmixing result is reused by multiplying with the second scaling factor to provide the second unmixed pixel.

3. The method of claim 1, wherein the similarity criterion comprises a threshold value, and wherein one of the plurality of multi-spectral unprocessed pixels is selected as the second pixel if a dot product of the normalized unprocessed pixel and the normalized first input pixel is below the threshold value.

4. The method of claim 1, wherein selecting the second pixel comprises performing a clustering algorithm on the image data to provide a set of pixel clusters, and wherein the second pixel meets the predefined similarity criterion with respect to the first input pixel if the second pixel and the first input pixel belong to a same pixel cluster from the set of pixel clusters.

5. A method of claim 1, wherein the first input pixel is selected from the image data randomly, or pseudo randomly, or in accordance with a predefined selection scheme, or by generating a histogram of pixel intensity values from the image data and selecting the first pixel from a set of most-frequently occurring pixels in the histogram.

6. The method of claim 1, further comprising performing an image segmentation of the image data to provide a set of image regions, wherein selecting the second pixel comprises searching an image region to which the first input pixel belongs, without searching other image regions in the set of image regions.

7. The method of claim 1, further comprising performing an image segmentation of the image data to provide a set of image regions, and performing the spectral unmixing of each image region in parallel.

8. The method of claim 1, wherein performing the spectral unmixing of the plurality of multi-spectral unprocessed pixels is discontinued when a number of remaining unprocessed pixels becomes smaller than a processing threshold.

9. An imaging system for imaging a multiplex slide of a biological tissue sample, the imaging system comprising:
  a memory configured to store image data acquired from the biological tissue, the image data comprising multi-spectral pixels,
  a processor being coupled to the memory and being configured to perform a spectral unmixing of the multi-spectral unprocessed pixels, wherein performing the spectral unmixing comprises:
    selecting a first input pixel from the image data, processing the first input pixel with an unmixing algorithm to generate an unmixing result for the first input pixel,
    selecting, from the plurality of multi-spectral unprocessed pixels, a second pixel that meets a predefined similarity criterion with respect to the first input pixel, and
    reusing the unmixing result obtained for the first input pixel for unmixing the second pixel without processing the second input pixel with the unmixing algorithm;
  wherein the processor is further configured to prepare for output an output image of the biological tissue comprising a first unmixed pixel corresponding to the first input pixel and a second unmixed pixel corresponding to the second pixel.

10. The imaging system of claim 9, further comprising an optical system for acquiring the image data and for storing the image data in the memory.

11. The system of claim 9, wherein the processor is further configured to perform an image segmentation of the image data to provide a set of image regions, wherein selecting the second pixel comprises searching an image region to which the first input pixel belongs, without searching other image regions in the set of image regions.

12. A non-transitory digital storage medium for storing executable instructions, which, when executed by a processor, cause the processor to perform operations comprising:
  sampling an input pixel from an image comprising a plurality of unprocessed pixels;
  unmixing the input pixel to generate an unmixing result for the input pixel;
  identifying whether any of the plurality of unprocessed pixels are similar to the input pixel, and forming a group of at least one pixel, wherein the group comprises the input pixel and any of the plurality of unprocessed pixels that are similar to the input pixel; and
  utilizing the unmixing result for the input pixel to obtain an unmixing result for other pixels in the group.

13. The digital storage medium of claim 12, wherein the operations further comprise normalizing the input pixel to a unit length.

14. The digital storage medium of claim 12, wherein the operations further comprise normalizing the unprocessed pixel to the unit length.

15. The digital storage medium of claim 12, wherein the identifying further comprises determining a similarity between the unprocessed pixels and the input pixel.

16. The digital storage medium of claim 15, wherein the similarity is determined based on a dot product between one of the unprocessed pixels and the input pixel.

17. The digital storage medium of claim 16, wherein the similarity is determined based on a determination whether the dot product exceeds a threshold.

18. The digital storage medium of claim 12, wherein the operations further comprise generating a plurality of groups corresponding to a plurality of input pixels.

19. The digital storage medium of claim 12, wherein the operations further comprise determining a scaling factor for the input pixel.

20. The digital storage medium of claim 19, wherein the operations further comprise multiplying the unmixing result with the scaling factor to determine a final unmixing result for the input pixel.

* * * * *